Jan. 30, 1945.  W. S. FLETCHER  2,368,533
AIRCRAFT ENGINE MOUNTING
Filed April 14, 1943
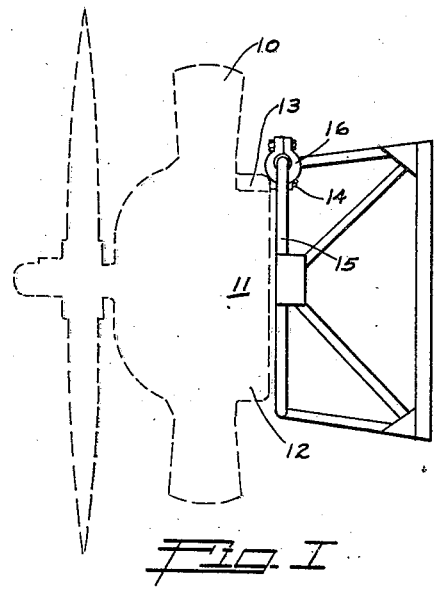
Fig. I
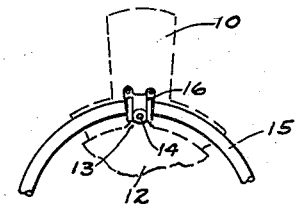
Fig. II
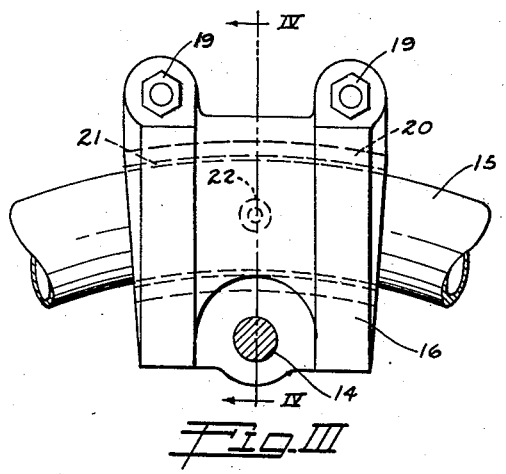
Fig. III
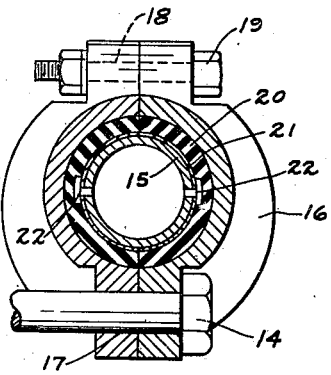
Fig. IV
INVENTOR.
Wendell S. Fletcher
BY Ernest K. Hill
ATTY.

Patented Jan. 30, 1945

2,368,533

UNITED STATES PATENT OFFICE 2,368,533

AIRCRAFT ENGINE MOUNTING

Wendell S. Fletcher, South Pasadena, Calif., assignor to Fletcher Aviation Corporation, Pasadena, Calif.

Application April 14, 1943, Serial No. 482,963

5 Claims. (Cl. 248—5)

This invention relates to resilient engine mountings for aircraft engines, particularly the radial aircooled type which are customarily attached to a circular mounting ring supported in spaced relationship to a firewall bulkhead. Customarily, such a mounting ring is built into the airplane or detachable as a unit therefrom, and various engines are more or less interchangeably mounted to the ring by a plurality of shock absorbing or vibration dampening mountings.

High powered engines are usually so mounted that the convergent mounting axes intersect the engine center-line near the center of gravity of the engine; but medium powered engines do not require such complicated and expensive mountings because the power impulses are of lesser magnitude in comparison with the weight and inertia of the engine. In such engines it has been heretofore proposed to use spool like mountings clamped to the mounting ring, engine torque being carried through the spool mounts against collars or brackets welded thereto. The difficulty and expense of welding properly spaced collars on the mounting ring have heretofore been a handicap to the use of such spool mounts since the engine torque should be evenly distributed over the usual 5, 7 or 9 brackets to prevent concentration and overloading of one bracket accompanied by a corresponding restriction of the resiliency and vibration absorbing capacity of the engine mount as a whole.

It is accordingly an object of this invention to provide an improved and simplified split spool type of rubber insulated engine mounting bracket which is individually pinned to the mounting ring which being completely isolated therefrom by a synthetic rubber bushing clamped thereto under slight positive pressure.

It is a further object of this invention to provide a symmetrical split spool type of engine mount bracket wherein each half has a metal half sleeve formed to embrace the mounting ring, a shear pin being mounted therethrough and held in place in the sleeve and the outer shell of the mounting bracket.

It is also an object of this invention to provide an engine mounting of the type described wherein the split halves of the mounting bracket are given a self adjusting movement about a single offset mounting bolt or stud attaching the mounting bracket to the engine; while the resiliency of the rubber like bond between the sleeves and shells of the bracket allows appreciable relative twisting and axial and lateral movements therebetween.

Other and further objects of this invention will become apparent as the description of the operation of the mounting brackets proceeds in connection with the accompanying drawing which forms a part of this specification and in which:

Figure I is a fragmentary elevation of an airplane engine and its mounting ring with the mounting bracket of this invention shown thereon.

Figure II is a rear elevation of Figure I with parts broken away to more clearly show the device of this invention.

Figure III is an enlarged view of the mounting bracket.

Figure IV is a central section of the bracket taken on the line IV—IV of Figure III.

As shown on the drawing:

An engine is indicated generally by the numeral 10 and the crankcase thereof by the numeral 11. A rear cover 12 for the crankcase usually carries a number of accessory drives, which have been omitted herein for clearness. A number of peripherally outstanding lugs 13 are provided around the crankcase 11 and its cover 12 which lugs are bored to receive a mounting bolt or stud 14, which holds a pair of the mounting brackets, to be described, to the crankcase and its cover. The engine is supported from a mounting ring 15 by a number of such mounting brackets, the ring 15 being rigidly supported from the airplane structure by struts.

Each mounting bracket is formed of identical halves comprising ribbed shells 16 having a single bolt hole 17 at one side to receive the mounting bolt or stud 14 and a pair of smaller bolt holes 18 and bolts 19 at its other or outer side relative to the engine axis. The two half shells are roughly bored or cast to a diameter appreciably larger than the diameter of the mounting ring 15 and are lined with a half bushing of synthetic rubber 20, or other oil resistant rubberlike material. Subsequent references to rubber will therefore be understood to include synthetic varieties thereof. The rubber bushing in turn is lined with a thin metal half shell 21 conforming to the curve of the mounting ring 15. The inner shell 21 has a large headed dowel pin 22 inserted in a central hole therein and projecting inwardly to enter a suitable hole in the mounting ring 15.

Each half shell 16, rubber bushing, and inner shell are bonded together by vulcanizing the rubber-like material to the shell and sleeve, the rubber in turn holding the dowell pin in its extended position in the inner sleeve.

With a series of these mounting brackets assembled between the engine and the mounting ring 15, the dead weight of the engine will have an individualized effect on each of the mountings, ranging through tension at the top mounting, to twisting effects on the side mountings, and compression at the bottom mountings. The single off-set bolt or stud 14 allows each pair of half shells to adjust themselves to the load and to cock slightly on the ring 15 if the load so requires.

When the engine is in operation other and different loads are superimposed on the mounting brackets, among which may be noted the propeller thrust, torque reactions, power pulsations and other shocks and vibrations inherent in aircraft engines. The eccentric mounting of the shells to the crankcase, together with the resiliency of the rubber bonding the shells and sleeves together allows the several mounts to equally distribute the loads and to absorb or prevent the transmission of vibration to the mounting ring and then to the aircraft structure.

It will thus be seen that I have invented an improved and simplified vibration dampening engine mounting of the split spool type wherein the various loads and vibrations are evenly distributed among the several mounts to the end that no one mounting will be overloaded and hence tend to be less efficient as a vibration insulator even if not overloaded to the point of failure.

I am aware that various changes and modifications may be made in the disclosed embodiment of my invention without departing from the spirit or scope thereof. The invention is therefore to be limited only as indicated by the scope of the appended claims.

I claim as my invention:

1. In a radial aircraft engine mounting a circular mounting ring fixed relative to the aircraft, an aircraft engine having a substantially circular rear crankcase flange and cover of smaller diameter than said mounting ring, said crankcase flange and cover having spaced peripheral bosses apertured to receive mounting bolts therein, split mounting shells so constructed and arranged as to embrace said circular mounting ring and having offset apertures therein in alignment with the apertured bosses on the crankcase cover, a bolt extending through said aperture into the apertured crankcase flange and cover for securing the shells thereto, split sleeves in said shells for engaging said mounting ring in annular spaced relationship to said shells, dowel pins disposed in said sleeves extending inwardly therefrom and adapted to engage in suitable apertures provided therefor in said mounting ring, and split rubber bushings interposed between said shells and said sleeves and bonded therebetween whereby to resiliently clamp said sleeves to said mounting ring upon clamping said shells together and to said crankcase flange and cover.

2. In a radial aircraft engine mounting a circular mounting ring fixed relative to the aircraft, an aircraft engine having a substantially circular rear crankcase flange and cover of smaller diameter than said mounting ring, said crankcase flange and cover having spaced peripheral bosses apertured to receive mounting bolts therein, split mounting shells so constructed and arranged as to embrace said circular mounting ring and having offset apertures therein in alignment with the apertured bosses on the crankcase cover, a bolt extending through said aperture into the apertured crankcase flange and cover for securing the shells thereto, split sleeves in said shells for engaging said mounting ring in annular spaced relationship to said shells, dowel pins disposed in said sleeves extending inwardly therefrom and adapted to engage in suitable apertures provided therefor in said mounting ring, said dowel pins having enlarged heads, and split rubber bushings interposed between said shells and said sleeves and bonded therebetween whereby to resiliently clamp said sleeves to said mounting ring upon clamping said shells together and to said crankcase flange and cover, and to hold the enlarged ends of the dowel pins against the sleeves.

3. A mount for connecting an engine to an engine supporting ring, said mount comprising symmetrical halves parted in the central plane of the supporting ring and axially cored in spaced relation to the ring, said halves being provided with at least two laterally extending apertured ears, a bolt extending through one pair of said ears and adapted to fasten the halves together on one side of the ring and to the engine, at least one bolt extending through a pair of ears on the opposite side of the mount to that of the first mentioned bolt and adapted to clamp the halves about said supporting ring, half sleeves engaging said supporting ring within said mount halves, dowel pins adapted to anchor said half sleeves to said supporting ring, and rubber half bushings each bonded between one half sleeve and one half mount whereby each half sleeve, half bushing and half mount are bonded together into a unit.

4. A mount for connecting an engine to a supporting ring disposed in a plane at right angles to the engine axis, comprising a series of matched half shells axially cored for clearance about said ring, said shells having apertured ears projecting respectively inside and outside the plane of the ring, one pair of said ears being adapted to be bolted to said engine and to permit rocking of said matched shells about said bolt, resilient half bushings bonded in said half shells, half sleeves formed to embrace said ring and bonded to said resilient half bushings, and dowel pins projecting inwardly from said half sleeves and adapted to engage in suitable apertures provided therefor in said ring.

5. In combination with a mount for a radial internal combustion engine including a mounting ring, means for resiliently supporting the engine from said ring comprising interchangeable half-shells adapted to embrace said mounting ring, means for simultaneously clamping said half-shells together and to the engine comprising a bolt or stud passing through suitable apertures in said half-shells on one side of said mounting ring and secured to said engine whereby said half-shells are pivotally attached to the engine for self-alignment with said mounting ring, and means for resiliently engaging said half-shells to said mounting ring comprising inner half sleeves in spaced alignment with the half-shells and having shear engagement with said mounting means, and rubber half bushings bonded between said inner half sleeves and said half-shells, said rubber bushings being adapted to transmit combinations of compression and shear loads between the sleeves and the shells.

WENDELL S. FLETCHER.